United States Patent [19]

Nelson

[11] Patent Number: 5,062,383

[45] Date of Patent: Nov. 5, 1991

[54] ANIMAL LITTER CONTAINING AN IMPROVED CLAY

[76] Inventor: Thomas E. Nelson, 3614 Montrose Blvd., #906, Houston, Tex. 77006

[21] Appl. No.: 427,009

[22] Filed: Oct. 25, 1989

[51] Int. Cl.$^5$ .............................................. A01K 29/00
[52] U.S. Cl. ..................................... 119/173; 119/171
[58] Field of Search ............................. 119/1, 171–173

[56] References Cited

U.S. PATENT DOCUMENTS

| | | | |
|---|---|---|---|
| 2,279,405 | 4/1942 | Laughlin | 119/1 |
| 4,085,704 | 4/1978 | Frazier | 119/1 |
| 4,437,429 | 3/1984 | Goldstein | 119/1 |
| 4,532,890 | 8/1985 | Ohki et al. | 119/1 |
| 4,591,581 | 5/1986 | Crampton et al. | 119/1 |
| 4,621,011 | 11/1916 | Fleischer et al. | 119/1 |
| 4,622,920 | 11/1986 | Goss | 119/1 |

FOREIGN PATENT DOCUMENTS 1437116  5/1976  United Kingdom ................... 119/1

*Primary Examiner*—John G. Weiss
*Attorney, Agent, or Firm*—A. Triantaphyllis

[57] ABSTRACT

An improved animal litter is disclosed containing a regular volatile material fuller's earth clay having a free moisture content of more than 7 percent but less than 25 percent. Furthermore, an improved animal litter is disclosed containing a regular volatile material fuller's earth clay in granular form. The granules are formed by compacting a pulverized regular volatile material fuller's earth clay.

12 Claims, No Drawings

ANIMAL LITTER CONTAINING AN IMPROVED CLAY

TECHNICAL FIELD

The present invention relates to the field of animal litters and, more particularly, to an animal litter containing a clay material Still more particularly, the present invention relates to an animal litter and a method of preparing the same wherein the animal litter contains a hydrated low volatile material fuller's earth clay.

BACKGROUND OF THE INVENTION

Animal litters containing fuller's earth clays are well known in the art. More particularly fuller's earth clays comprised of the mineral montmorillonite and alumino silicates have been used in connection with animal litters, alone or in combination with other substances.

In most applications, the fuller's earth clay is calcined by heating it to a finishing temperature of more than 180° C. to remove all of the free moisture and a portion or all of the interstitial moisture of the clay. Clay heated to a finishing temperature higher than 180° C. but less than 1000° C. is known as a lower volatile material ("LVM") clay. Such clay has no free moisture but some interstitial moisture. Fuller's earth clays which are calcined by heating them to a finishing temperature of more than 180° C. are non-colloidal. Non-colloidal clays are those that do not form colloids when dispersed in a liquid environment such as water.

One disadvantage of the above described fuller's earth clays when used as an animal litter is that they do not form clumps when exposed to urine, or, if they do, such clumps are not cohesive. The clumps, for example, formed by LVM clay disintegrate completely when removed or dislodged. Another disadvantage is that they do not absorb the urine readily whereby the urine accumulates at the bottom of the litter box.

In order to improve the clumping and absorbing properties of fuller's earth clays, the clays are sometimes partially calcined to remove all of the free moisture thereof by heating them to a finishing temperature of not more than 180° C., usually 120° C. to 150° C. Such clays are colloidal in that they form a colloid when exposed to or dispersed in a liquid environment such as an aqueous environment. These partially calcined clays are known as regular volatile material ("RVM") clays.

An animal litter being presently sold by Sanex Corporation of Houston, Texas, under the trademark Better Way ® utilizes regular volatile material clay and, more particularly, regular volatile material attapulgite. Although such clay readily absorbs the urine and forms strong and cohesive clumps that can be removed, the clumps are occasionally broken by the animal when the animal burrows in the litter or by the animal owner when he removes the clumps from the litter box. The inventor has found that by increasing the free moisture content of the regular volatile material clay used as litter, the litter forms stronger and more cohesive clumps when exposed to urine. The addition of free moisture to a regular volatile material clay when used in connection with an animal litter has not been practiced in the past by anyone.

U.S. Pat. No. 4,437,429 discloses an improved animal litter that includes a non-colloidal fuller's earth clay and an effective amount of a hydrated zeolite. It is well understood by those skilled in the art that a non-colloidal clay is a clay that is calcined by being heated to a finishing temperature of more than 180° C. One disadvantage of the animal litter disclosed in that patent is that the entire litter box must be disposed of after a certain period of time.

U.S. Pat. No. 4,085,704 discloses an animal litter that produces a continuous, long lasting, uniform, slowly released odor control agent. The patent discusses the addition of non-colloidal fuller's earth clay to the animal litter to reduce the cost of the litter.

U.S. Pat. No. 4,532,890 make reference to Japanese Patent Application Laid-Open No. 129622/1982 that discloses the use of zeolite as a deodorizer together with a bentonite. Bentonite is non-colloidal bentonite.

Although some of the animal litters utilizing fuller's earth clays form clumps when exposed to urine, the present invention discloses an animal litter that forms stronger clumps and a method of preparing such litter.

These and other objects and advantages of the present invention will become readily apparent from the following description.

SUMMARY OF THE INVENTION

The present invention discloses an improved animal litter that contains a regular volatile material fuller's earth clay which is obtained by partially calcining the fuller's earth clay by heating it to a finishing temperature of not more than 180° C. Moisture is added to the partially calcined fuller's earth clay to increase its free moisture to more than 7 weight percent but to no more than 25 weight percent. When used as an animal litter, such hydrated fuller's earth clay forms strong and cohesive clumps when exposed to urine. Those clumps are not easily breakable by the animal or by any one removing the clumps from the animal litter.

In another embodiment of the invention, an improved animal litter is disclosed containing a regular volatile material fuller's earth clay which is formed by pulverizing the relative volatile material fuller's earth clay and compacting the pulverized material to form granules of 10/90 mesh size. Prior to being compacted, moisture may be added to the pulverized material to increase the free moisture content thereof to no more than 25 weight percent.

DESCRIPTION OF THE PREFERRED EMBODIMENTS

According to the present invention an improved animal litter is formed by utilizing a regular volatile material fuller's earth clay whose free moisture content is increased to more than 7 weight percent but to no more than 25 weight percent. The animal litter forms strong and cohesive clumps after being exposed to an aqueous substance such as urine. The clumps are easily removable from the litter box and are disposed of accordingly. Furthermore, according to the present invention, an improved animal litter is disclosed which is formed by pulverizing a regular volatile material fuller's earth clay and compacting the pulverized material to form granules of a 10/90 mesh size. Prior to the compacting step, moisture may be added to the clay to increase its free moisture content to no more than 25 weight percent.

Certain terms are used herein to quantify and describe the water content of the clays including the terms free moisture, combined or interstitial moisture, structural moisture, and total moisture. As used herein, free moisture is the amount of water being physically adsorbed by the clay; combined or interstitial moisture is the amount of water being bound in the matrix of the clay; structural moisture is the amount of water which is chemically bonded to the clay; and total moisture is the aggregate of the free moisture and the combined moisture. The free moisture of the clay is expressed herein as the weight percentage of the total weight of the clay including its combined moisture and its structural moisture. For example, if, in a clay, the free moisture is 7 grams, the interstitial moisture is 3 grams, the structural moisture is 2 grams and the weight of the clay without the free moisture, the interstitial moisture and the structure moisture is 88 grams, the free moisture is 7 weight percent.

The clays used herein are offered commercially in a broad range of particle sizes. Particle sizes are measured herein by sieve screen mesh sizes of the U.S. Standard Screen series (ASTM Specification E-11-70 values). When two mesh sizes are used together and separated by a virgule ("/"), the first listed mesh size designates passage of the material through such mesh size and the second listed, larger-numbered mesh size designates retention of the material by such mesh size. For example, use of "8/16" indicates passage through a 8 mesh screen and retention by a 16 mesh screen. Similarly, use of a material or particles being of a "8/16 mesh size" refers to all material or particles whose size is such that they pass through a 8 mesh screen but are retained by a 16 mesh screen. Alternatively, it refers to all material or particles whose size is smaller than 8 mesh but larger than 16 mesh.

(a) Animal Litter Containing Clay With An Increased Moisture

The clay that is used in connection with the present invention is a regular volatile material fuller's earth clay derived from a fuller's earth as described in the background of the invention. More particularly, it is derived by partially calcining a naturally available fuller's earth clay by heating it to a finishing temperature of not more than 180° C. When the regular volatile material clay is removed from the oven, its free moisture is negligible, if not zero. After it is exposed to the humidity of the atmosphere, it adsorbs water and its free moisture is normally raised to the range of 3 to 5 weight percent. Sometimes, in a very humid environment, the free moisture of the clay may reach as high as 7 weight percent. The regular volatile material fuller's earth clay is colloidal, i.e., it forms colloids when exposed to a liquid such as water.

Fuller's earth clays are materials found in the ground. They are composed primarily of hydrous aluminum silicates. They also contain small amounts of non-clay material. Examples of fuller's earth clays include montmorillonite, kaolin, illite, halloysite, vermiculite, sepiolite, bentonite and attapulgite. For a more detailed description of fuller's earth clays, reference is made to U.S. Pat. No. 4,459,368. That description is incorporated herein and made a part hereof by reference. In the present invention, the most preferred regular volatile material fuller's clay is regular volatile material attapulgite. A preferred clay is regular volatile material bentonite.

According to the present invention, the ability of the regular volatile material fuller's earth clay to form stronger and more cohesive clumps when used as an animal litter following exposure to urine is improved by increasing its free moisture contents to more than 7 weight percent but to no more than 25 weight percent. The addition of the moisture is accomplished by exposing the clay to water and allowing it to adsorb said water until its free moisture reaches the desired level. The preferred free moisture content is in the range of 10 to 15 weight percent and the most preferred is about 15 weight percent. It should be understood that, if the free moisture content is increased to above 25 weight percent, the handling of the clay becomes impractical because of its wetness.

The particle size of the clay may vary. The clays, however, are usually available in 8/16, 16/30, 24/48, 20/60, 30/60, or 60/90 and smaller mesh sizes. Accordingly, the clay particles may be of 8/90 or smaller mesh size. The preferred mesh size is 20/60 and the most preferred is 30/60.

(b) Animal Litters Containing Reconstituted Clays

In another embodiment of the present invention, a reconstituted regular volatile material fuller's earth clay is used as an animal litter. The clay is formed by, first, pulverizing a regular volatile material fuller's earth clay to particles of a mesh size of 90 or smaller and, then, compacting the pulverized material to form granules of 10/90 mesh size. Clays formed in this manner are sometimes referred to herein as reconstituted clays. On the contrary, the clays referred to in Section (a) above are sometimes referred to herein as non-reconstituted clays.

One advantage of the reconstituted clay is that the size of the granules may be controlled whereby they can be of more uniform size than the non-reconstituted clay. Uniformly sized granules have the ability to form clumps that are stronger and more cohesive when the clay is exposed to urine. Another advantage is that reconstituted clay forms stronger and more cohesive clumps than non-reconstituted clay that has the same free moisture content as the reconstituted clay. One disadvantage of the reconstituted clay is that the unclumped clay, i.e., the clay which has not been exposed to an aqueous environment such as urine, oftentimes breaks into small particles (dust).

The reconstituted clay may be further improved for use as an animal litter by hydrating the pulverized material prior to compacting it to form the granules The pulverized material is hydrated to a free moisture of more than 7 weight percent but no more than 25 weight percent. When free moisture is added, the ability of the clay to form strong and cohesive clumps is improved. The most preferred free moisture is about 10 weight percent. The inventor has found that the cohesiveness and the strength of the clumps formed by reconstituted regular volatile material attapulgite having a free moisture content of about 10 percent is about equal to the strength and cohesiveness of the clumps formed by non-reconstituted regular volatile material attapulgite having a free moisture content of about 15 percent.

The above described non-reconstituted clays may be combined with the above described reconstituted clays in an animal litter. The weight ratio of clays so combined may vary depending on the particle sizes and the free moisture contents of the clays.

While the invention has been described herein with connection with certain preferred embodiments, modification thereof can be made by one skilled in the art without departing from the spirit of the invention.

What is claimed is:

1. A method of improving a regular volatile material Fuller's Earth clay for use as an animal litter, comprising the step of adding water to the regular volatile material Fuller's Earth clay to increase its free moisture content to more than 7 weight percent.

2. A method according to claim 1 wherein the free moisture of the clay is increased to more than 7 weight percent but to no more than 25 weight percent.

3. A method according to claim 1 wherein the free moisture content of the clay is increased to about 10 to 15 weight percent.

4. A method according to claim 1 wherein the free moisture content of the clay is increased to about 15 weight percent.

5. A method according to claim 1 wherein the clay is attapulgite.

6. A method according to claim 1 wherein the clay is bentonite.

7. A method of preparing a regular volatile material fuller's earth clay for use as an animal litter, comprising the steps of:

adding water to a pulverized regular volatile material fuller's earth clay to increase its free moisture content; and compacting the pulverized regular volatile material fuller's earth clay to form granules.

8. A method according to claim 7 further including the step of forming the pulverized clay by pulverizing an unpulverized clay.

9. A method according to claim 7 wherein the pulverized material is of 90 or smaller mesh size.

10. A method according to claim 7 wherein the free moisture content is increased to more than 7 weight percent but to no more than 25 weight percent.

11. A method according to claim 10 wherein the free moisture content is increased to about 10 weight percent.

12. A method according to claim 7 wherein the granules are of 10/90 mesh size.

* * * * *